(12) United States Patent
Korcz et al.

(10) Patent No.: US 7,659,477 B2
(45) Date of Patent: Feb. 9, 2010

(54) MOUNTING BRACKET WITH FAR SIDE SUPPORT

(75) Inventors: Krzysztof W. Korcz, Granger, IN (US); Steven J. Johnson, Galien, MI (US)

(73) Assignee: Hubbell Incorporated, Orange, CT (US)

( * ) Notice: Subject to any disclaimer, the term of this patent is extended or adjusted under 35 U.S.C. 154(b) by 339 days.

(21) Appl. No.: 11/496,726

(22) Filed: Aug. 1, 2006

(65) Prior Publication Data

US 2008/0029287 A1    Feb. 7, 2008

(51) Int. Cl.
*H01H 13/04* (2006.01)

(52) U.S. Cl. .............................. 174/58; 174/53; 174/57; 174/50; 220/3.2; 220/3.3; 248/906

(58) Field of Classification Search ................. 174/480, 174/481, 50, 53, 57, 58; 220/3.2–3.9, 4.02; 248/906
See application file for complete search history.

(56) References Cited

U.S. PATENT DOCUMENTS

| | | | |
|---|---|---|---|
| 1,453,017 A | 4/1923 | Lindelof | |
| 2,299,674 A | 10/1942 | Austin | |
| 2,423,757 A | 7/1947 | Dedge | |
| 2,473,051 A | 6/1949 | Carlson | |
| 2,512,188 A | 6/1950 | Wait et al. | |
| 2,531,840 A | 11/1950 | Carlson | |
| 3,767,151 A | 10/1973 | Seal et al. | |
| 4,399,922 A | 8/1983 | Horsley | |
| 4,533,060 A | 8/1985 | Medlin | |
| 4,569,458 A | 2/1986 | Horsley | |
| 4,572,391 A | 2/1986 | Medlin | |
| 4,603,789 A | 8/1986 | Medlin, Sr. | |
| 4,645,089 A | 2/1987 | Horsley | |
| 4,688,693 A | 8/1987 | Medlin, Jr. | |
| 4,732,356 A | 3/1988 | Medlin, Sr. | |
| 4,898,357 A | 2/1990 | Jorgensen et al. | |
| 4,903,851 A | 2/1990 | Slough | |
| 4,964,525 A | 10/1990 | Coffey et al. | |
| 4,978,092 A | 12/1990 | Nattel | |
| 5,176,345 A | 1/1993 | Medlin | |
| 5,423,499 A * | 6/1995 | Webb | ............... 248/906 |
| 5,452,873 A * | 9/1995 | Laughlin | ............... 248/906 |
| 5,646,371 A | 7/1997 | Fabian | |
| 5,744,753 A * | 4/1998 | Nattel | ............... 174/58 |
| 5,810,303 A | 9/1998 | Bourassa et al. | |
| 6,573,449 B2 * | 6/2003 | Vrame | ............... 174/58 |

(Continued)

*Primary Examiner*—Angel R Estrada
(74) *Attorney, Agent, or Firm*—Alfred N. Goodman; Mark S. Bicks; Garrett V. Davis

(57) ABSTRACT

A mounting bracket is provided for supporting an electrical box to a support structure. The mounting bracket includes a mounting base for coupling to the electrical box, and a body member extending perpendicular to the mounting base and extending against the back wall of the electrical box. The body member includes a support member and extension member that can be folded outwardly from the back wall of the electrical box to contact an opposing wall and support the electrical box. In another embodiment, the mounting bracket includes a front plate with a central opening for receiving an electrical box and a pair of extension members that extend in a rearward direction with respect to the electrical box. The support members can include an extension member that can be folded outwardly to contact an opposing wall surface to support the electrical box.

37 Claims, 12 Drawing Sheets

U.S. PATENT DOCUMENTS

| | | | |
|---|---|---|---|
| 6,590,155 B2 * | 7/2003 | Vrame et al. | 174/50 |
| 6,723,918 B2 * | 4/2004 | Vrame | 174/50 |
| 6,765,146 B1 * | 7/2004 | Gerardo | 174/58 |
| 6,996,943 B2 * | 2/2006 | Denier et al. | 248/906 |
| 7,053,300 B2 * | 5/2006 | Denier et al. | 174/58 |
| 7,271,336 B2 * | 9/2007 | Dinh | 174/58 |

* cited by examiner

MOUNTING BRACKET WITH FAR SIDE SUPPORT

FIELD OF THE INVENTION

The present invention is directed to a mounting bracket for an electrical box or other electrical component. The invention is particularly directed to a mounting bracket for accommodating wall cavities of different depths between opposing walls and for supporting the electrical box.

BACKGROUND OF THE INVENTION

Electrical boxes are commonly mounted on various mounting brackets for securing the electrical box to a wall stud, ceilings, or other support. The electrical boxes are dimensioned to support electrical receptacles, switches and other components and must be securely mounted to the wall stud. Many electrical boxes include a mounting bracket extending from one side of the electrical box so that only one side of the electrical box is supported by the bracket. The opposite side of the electrical box often does not include a support so that some movement of the electrical box can occur during use.

To provide support of opposite ends of the electrical box, a number of brackets have been proposed. Typically, the bracket includes a first member for attaching to a wall stud and a second member connected to the opposite side of the box so that both sides of the electrical box are supported to resist movement with respect to the wall.

One example of a prior support bracket is disclosed in U.S. Pat. No. 4,399,922 to Horsley. The bracket as disclosed includes an extension arm bent at a right angle to a plate that supports the electrical box. The plate has one side edge provided with holes for securing the plate to a wall stud. The extension arm is formed on the opposite end and has a length to contact a wall on the other side of the wall stud. The extension member includes a series of score lines that can be broken off for use with walls having different depths.

Another device is disclosed in U.S. Pat. No. 4,732,356 to Medlin. This device also includes a plate member for supporting an electrical box. The plate includes a first end portion for attaching to the wall stud and a second end portion having an L-shaped arm to contact the opposite wall. A separate extension plate is attached to the L-shaped arm to adjust the length of the arm for different depths between the walls.

U.S. Pat. No. 4,688,693 to Medlin discloses an outlet box stabilizer bracket having an extension formed at a right angle to the bracket to contact an opposing wall. The extension is cut from the bracket and bent from the bracket to form a central opening in the bracket.

U.S. Pat. No. 4,964,525 to Coffey et al. discloses an electrical box mounting bracket for connecting to a wall stud. The bracket includes a pair of side mounted support legs that are bent at a right angle from the bracket to engage the opposite wall.

Examples of other mounting brackets that contact the opposing wall are disclosed in U.S. Pat. No. 4,645,089 to Horsley, U.S. Pat. No. 4,533,060 to Medlin, U.S. Pat. No. 4,569,458 to Horsley, U.S. Pat. No. 4,572,391 to Medlin, and U.S. Pat. No. 4,603,789 to Medlin.

While the devices and brackets have been generally suitable for the intended purpose of supporting an electrical box, there is a continuing need in the industry for improved support brackets and methods of producing the brackets.

SUMMARY OF THE INVENTION

The present invention is directed to a support bracket for attaching to an electrical box. In particular, the invention is directed to a support mounting bracket having an extendable portion that is able to contact the inner surface of an opposing wall to support the electrical box.

Accordingly, a primary aspect of the invention is to provide a mounting bracket for attaching to an electrical box. The mounting bracket in one embodiment attaches to the side wall of the electrical box and has a body portion that lies flat against the rear wall of the electrical box when the mounting bracket is in the inoperative position.

A further aspect of the invention is to provide a mounting bracket for an electrical box having a body portion contacting the rear face of the electrical box and a support member that can bend outwardly to contact the inner surface of the opposing wall to support the electrical box.

Another aspect of the invention is to provide a mounting bracket for an electrical box having a support member that can bend outwardly to an extended position and where the support member has an extension member cut from an inner area of the support member and can bend outwardly to increase the length of the support member.

Still another aspect of the invention is to provide a mounting bracket that can be formed as a single unitary piece that is formed from a flat blank material and folded to the desired shape.

Another feature of the invention is to provide a mounting bracket for an electrical box where the bracket has a central opening for mounting to the open end of an electrical box. The mounting bracket includes at least one support member that folds outwardly from the inner edge of the central opening for supporting the electrical box. In one embodiment, the mounting bracket includes two support members on opposite sides of the central opening that are cut from the material to form the central opening. Each of the support members are folded perpendicular to the plane of the mounting bracket.

These and other aspects of the invention are basically attained by providing a mounting bracket for coupling to and supporting an electrical box which comprises a mounting base for coupling to the electrical box, and at least one body member extending perpendicular to the mounting base and coupled thereto. The body has a support member coupled to the body by a fold line for bending the support member to a position perpendicular to the body. The support member has an extension member coupled to the support member by a fold line and is bendable to an outward position with respect to the body for supporting the electrical box.

The various aspects and advantages of the invention are also attained by providing an electrical box assembly which comprises an electrical box having at least one side wall, a back wall, an open front and an inner cavity for receiving electrical wiring. The electrical box is mountable to a support structure for supporting a first wall structure. An adjustable bracket for supporting at least one side of the electrical box against an opposing second wall structure is provided. The bracket has a base coupled to the at least one side wall of the electrical box. A body extends perpendicular to the base and lies in a first position against the back wall of the electrical box. The body has a first portion coupled to the base and is perpendicular to the base. A second portion is coupled to the first portion by a fold line and is bendable to a position perpendicular to the first portion and to the back wall of the electrical box. The second portion of the body has a length to contact the opposing wall to support the electrical box against the opposing second wall.

The advantages of the invention are further attained by providing a mounting bracket for an electrical box which comprises a base for mounting an electrical box with respect to a first wall and having a central opening for accessing the electrical box. The base has a first side edge and a second side edge opposite the first side. A first support member is coupled to the first side of the base and extends in a direction perpendicular to a plane of the base and has a length for contacting an opposing wall. A second support member is coupled to the second side of the base and extends in a direction perpendicular to the plane of the base and has a length for contacting a opposing wall.

The various aspects and salient features of the invention will become apparent from the following detailed description of the invention in connection with the annexed drawings which disclose various embodiments of the invention.

DETAILED DESCRIPTION OF THE INVENTION

The present invention is directed to a mounting bracket for coupling to and supporting an electrical box. In particular, the invention is directed to a mounting bracket having an extendable member that can bend outwardly to contact the inner surface of an opposing wall to support the electrical box. The extendable member can be bent along one of a plurality of fold lines to select the desired length for accommodating wall cavities of varying depths.

Figure 1:
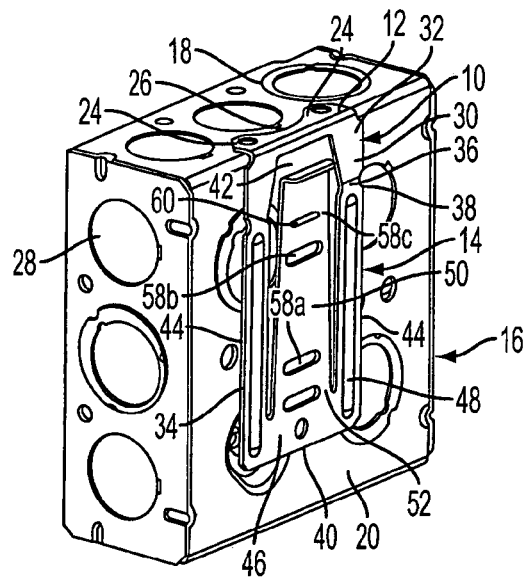
FIG. 1 is a perspective view of the mounting bracket in a first embodiment attached to an electrical box.

Referring to FIGS. 1-6, a first embodiment of the invention includes a mounting bracket 10 having a mounting base 12 and a body member 14. Mounting bracket 10 is constructed for attaching to an electrical box 16 as shown in FIG. 1.

Figure 2:
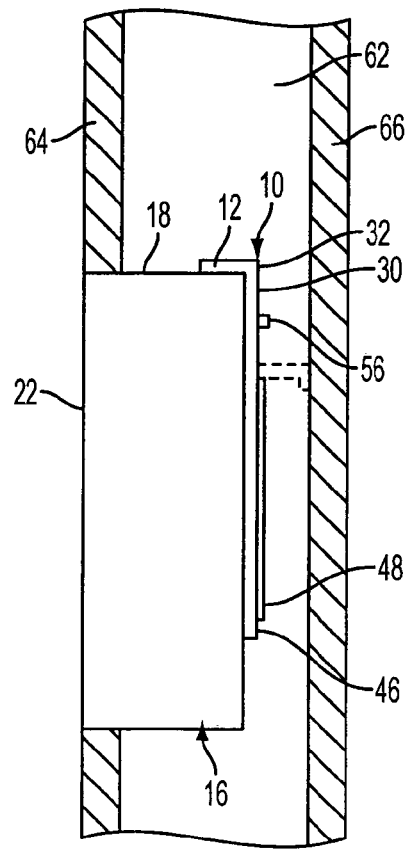
FIG. 2 is a side view of the electrical box and mounting bracket of FIG. 1.

Mounting base 12 is formed at an angle substantially perpendicular to the plane of body member 14 as shown in FIGS. 1 and 2 to define a substantially L-shape. Mounting base 12 forms a tab-like member that is attached to a side wall 18 of electrical box 16. Electrical box 16 is typically a standard electrical box having side walls 18, a back wall 20 and an open front end 22 for receiving an electrical device and electrical wiring. In the embodiment illustrated, mounting base 12 is attached to side wall 18 in substantially the center portion thereof so that body member 14 of mounting bracket 10 lies flat against back wall 20 of electrical box 16.

Mounting base 12 in the embodiment illustrated has a pair of ears 24 with a concave surface or edge 26 therebetween. Ears 24 can have an aperture for receiving a suitable fastener for attaching mounting base 12 to side wall 18. Alternatively, mounting base 12 is permanently attached to side wall 18 by crimping, spot welding, punching or other suitable fastening means. Concave surface 26 is provided to allow clearance around knock-out plug 28 to enable a cable connector to be coupled to side wall 18 without interfering with mounting base 12.

Body member 14 has a substantially flat planar configuration when in the original position and lies flat against the back wall 20 of electrical box 16. As shown in FIG. 1, body member 14 has a length slightly less than the dimension of back wall 20 of electrical box 16 so that body member 14 does not interfere with the use of the electrical box when body member 14 is not in use. In alternative embodiments, body member 14 can have a dimension substantially equal to or greater than the dimension of back wall 20. Body member 14 has a first portion 30 defining a first end 32 connected to mounting base 12 by a fold line and to form the L-shape of bracket 10. First portion 30 is substantially perpendicular to mounting base 12 and preferably lies flat against back wall 20 of electrical box 16. A support member 34 is coupled to first portion 30 by a fold line 36 to define an extendable member. Body member 14 includes a pair of notches 38 that define fold line 36 between first portion 30 and support member 34 and define a first end of support member 34. Support member 34 has a second outer end 40 that also defines the end of body member 14.

Support member 34 has a cut-out center portion 42 so that support member 34 is defined by a pair of parallel legs 44. Legs 44 extend in a longitudinal direction with respect to body member 14 and are connected to an end portion 46 at second end 40 of body member 14. Each leg 44 has a raised rib 48 to provide additional strength to the legs and resist bending of legs 44. Ribs 48 are preferably formed by stamping.

Cut-out portion 42 of body member 14 defines an extension member 50. Extension member 50 has a first end connected to end portion 46 by a fold line 52. Extension member 50 has a second end 54 with an outwardly extending tab 56. Extension member 50 preferably is provided with a plurality of fold lines 58a, b and c to allow extension member 50 to be folded to define a selected length to accommodate wall cavities of different depths. Each of the fold lines 52 and 58 in one embodiment of the invention are defined by slots 60 that extend transversely with respect to a longitudinal direction of extension member 50.

In use, mounting bracket 10 is attached to electrical box 16 by attaching mounting base 12 to a side wall 18 of electrical box 16. Electrical box 16 is then attached to a wall stud 62 or other support structure that supports a wall surface 64 as shown in FIG. 2. Typically, the open front end of electrical box 16 is mounted flush with the outer surface of wall 64. Mounting bracket 10 can be left in its original position as shown in FIG. 1. In one embodiment, extension member 50 can be folded along one of the fold lines 58a, b and *c* so that tab 56 contacts the inner surface of an opposing wall 66 indicated by phantom lines in FIG. 2.

Figure 3:
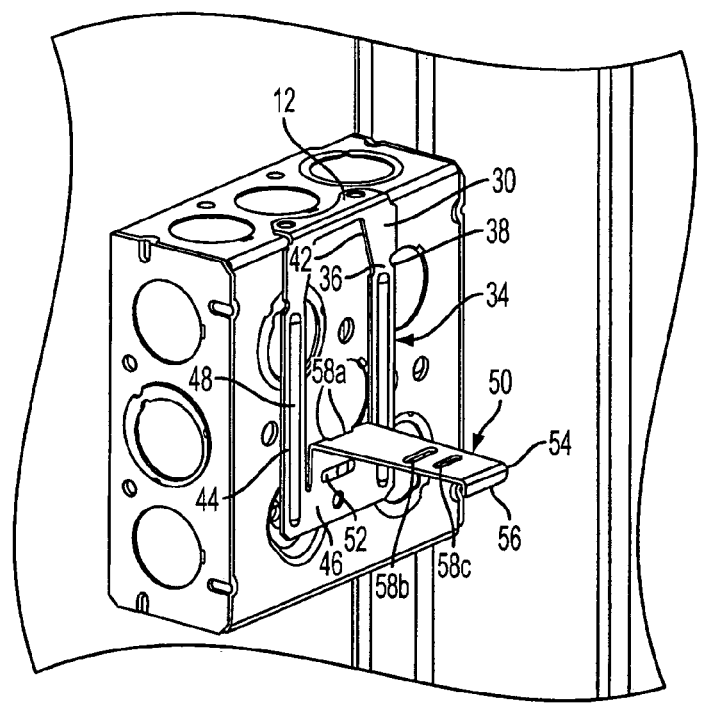
FIG. 3 is a perspective view of the mounting bracket of FIG. 1 showing the extension member bent outwardly from the plane of the mounting bracket.
Figure 4:
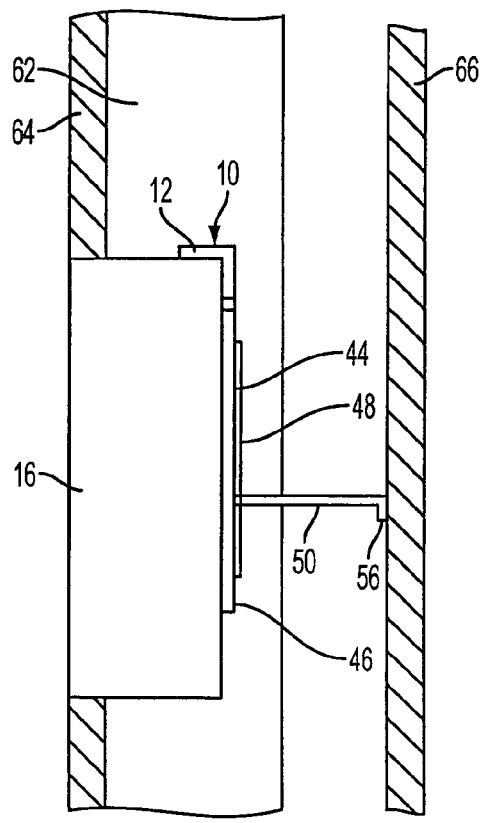
FIG. 4 is a side view of the electrical box and mounting bracket of FIG. 3.

Mounting bracket 10 is able to contact wall structures having different spacing between the opposing walls. As shown in FIGS. 3 and 4, extension member 50 can be folded a fold line 58a so that extension member 50 extends outwardly a distance greater than the distance depicted in FIG. 2. As shown in FIG. 4, tab 56 is also able to contact the inner surface of opposing wall 66 to support electrical box 16 and resist movement of electrical box 16 with respect to the wall stud 62.

Figure 5:
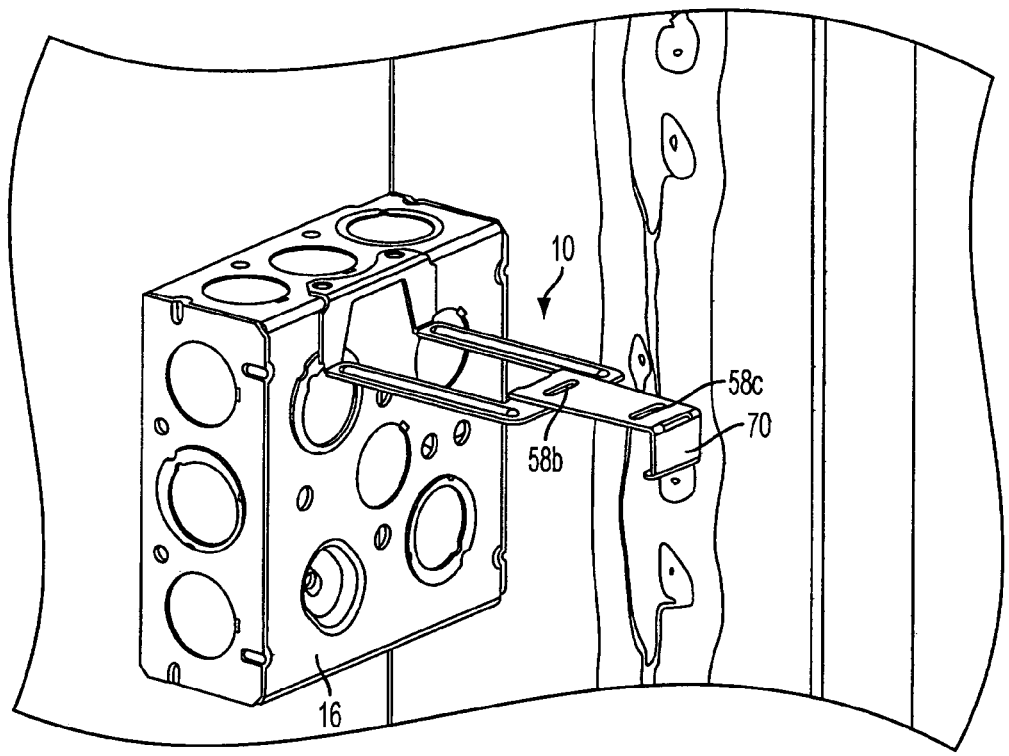
FIG. 5 is a perspective view of the mounting bracket of the embodiment of FIG. 1 showing the support member and extension member in the extended position.
Figure 6:
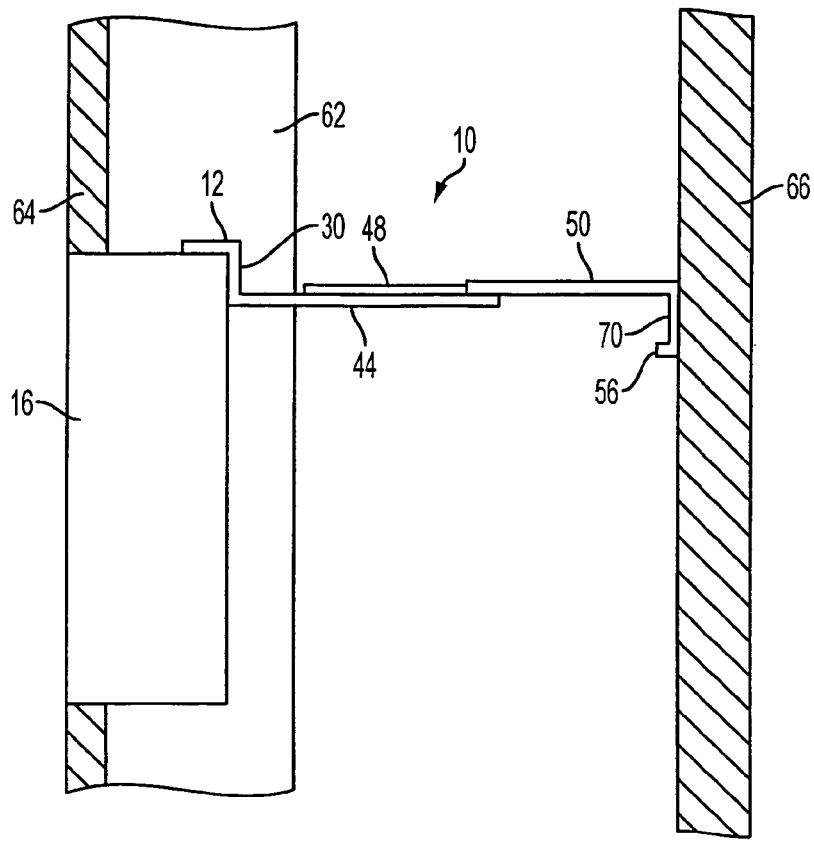
FIG. 6 is a side view of the mounting bracket in the position of FIG. 5.

In a further embodiment shown in FIGS. 5 and 6, support member 34 is bent outwardly along fold line 36 to extend substantially perpendicular to first portion 30 and parallel to mounting base 12. Extension member 50 is folded along fold line 50 to be substantially parallel with support member 34, thereby extending a greater distance than in the embodiment shown in FIGS. 3 and 4. In the embodiment shown in FIGS. 5 and 6, extension member 50 is folded along fold line 58c to form an end member 70 to contact the inner surface of opposing wall 66. When support member 34 is folded outwardly perpendicular to first portion 30 of body 14 as shown in FIG. 5, extension member 50 can be folded along any one of the selected fold lines 58a, b or *c*, depending on the spacing between the walls 64 and 66. Alternatively, extension member 50 can be bent outwardly without bending fold lines 58a, b or *c*, so that tab 56 contacts the inner surface of opposing wall 66.

In the embodiment illustrated, mounting bracket 10 is shown attached along a top wall of the electrical box with respect to the vertical direction of wall stud 62. It will be appreciated that the electrical box can be oriented so that mounting bracket 10 is positioned opposite the wall stud 62 or along the bottom portion or bottom wall of electrical box 16.

Figure 7:
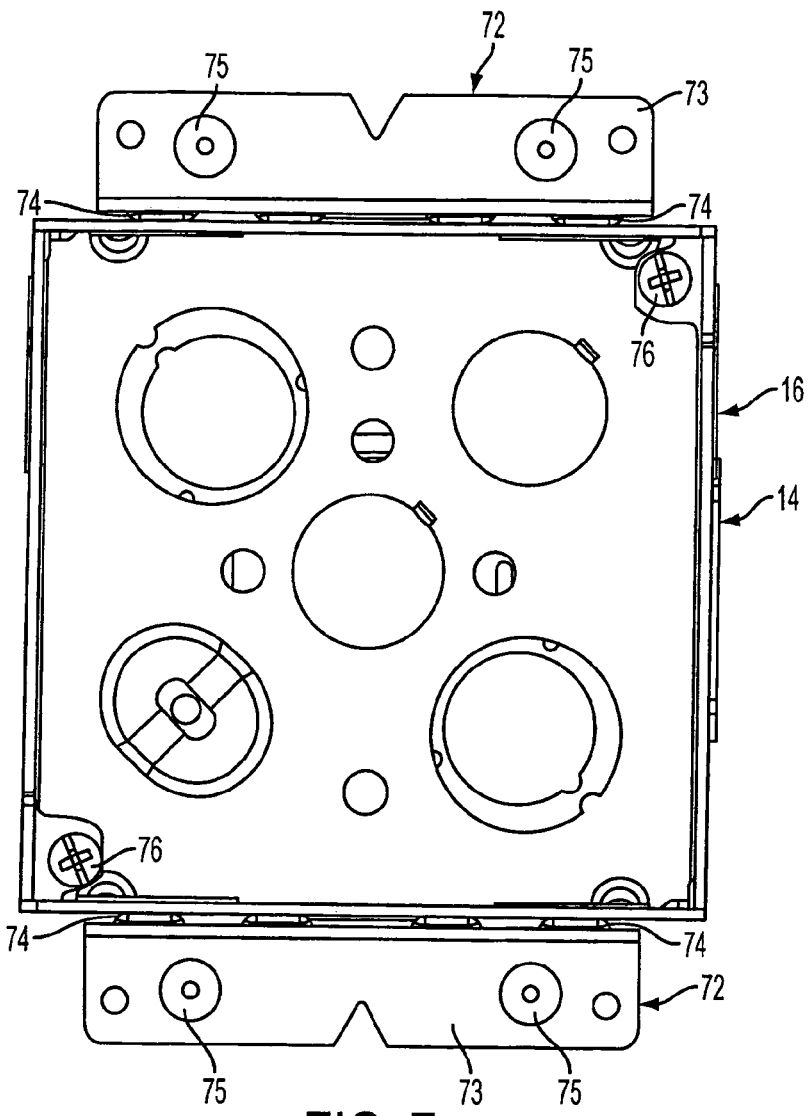
FIG. 7 is a top view of another embodiment showing the mounting brackets attached to the electrical box.
Figure 8:
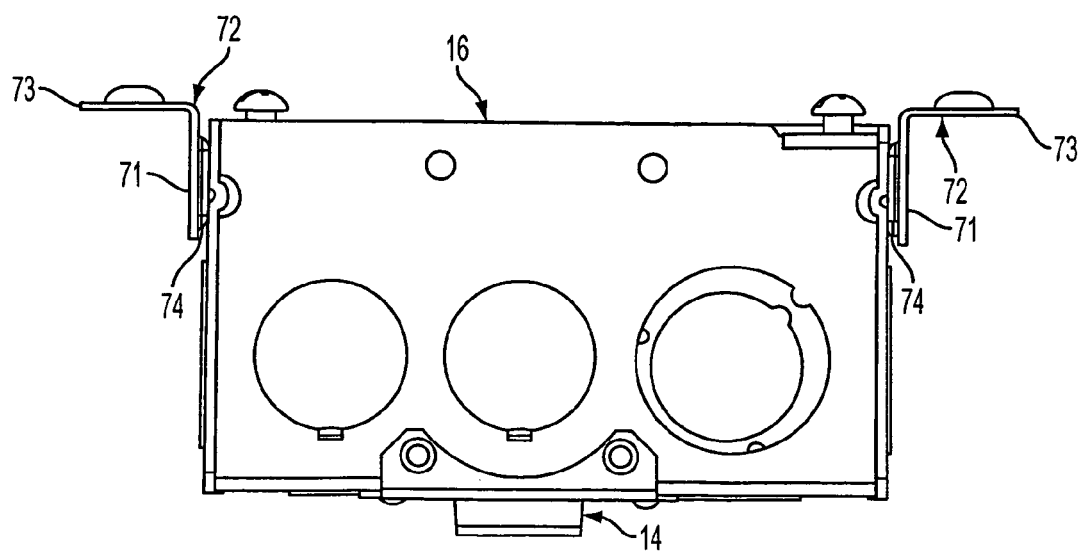
FIG. 8 is a side view of the electrical box of FIG. 7.
Figure 9:
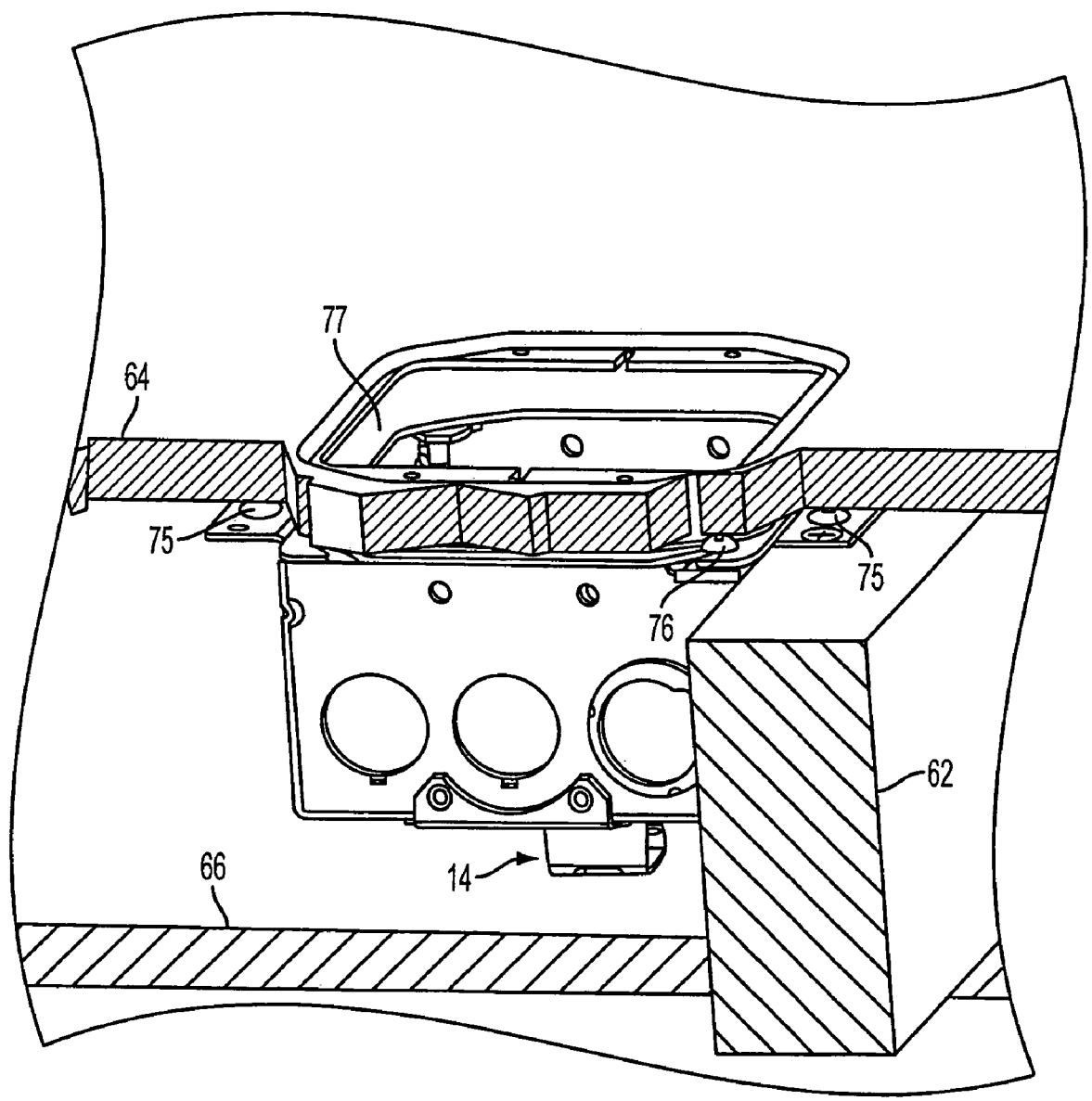
FIG. 9 is a perspective view of the electrical box of FIG. 7 showing the mud ring and wall structure.

Referring to FIGS. 7-9, one embodiment of the invention includes brackets 72 attached to opposite sides of electrical box 16 for mounting electrical box 16 to a wall stud or other support. Bracket 72 includes a first leg 71 and a second leg 73 extending perpendicular to leg 71. Leg 71 includes a plurality of detents 74 for attaching bracket 72 to a side wall of electrical box 16 by a spot weld or the like. As shown in FIG. 8, second leg 73 lies in a plane spaced from the top edge of electrical box 16.

The top or outer face of second leg 73 includes a pair of spaced-apart embosses 75 protruding outwardly and having a generally convex outer profile. Embosses 75 have an outer dimension and a height corresponding substantially to the dimension of a screw head or other fastener that is used to fasten the bracket 72 to a wall stud. Embosses 75 also have a height substantially equal to screws 76 threaded into electrical box 16 for mounting a mud ring 77 to the electrical box. As shown in FIG. 9, the outer wall 64 contacts the outer surface of the embosses 75 so that wall 64 is spaced from screws 76. In this manner, screws 76 do not interfere with the mounting of the wall 64.

Embodiment of FIGS. 10-18

Referring to FIGS. 10-18, a second embodiment of the invention is shown for supporting an electrical box and for mounting an electrical box to a support structure. Mounting bracket 80 is formed from a blank 82 shown in FIG. 10 to form a front plate 84 and support members 86.

Figure 11:
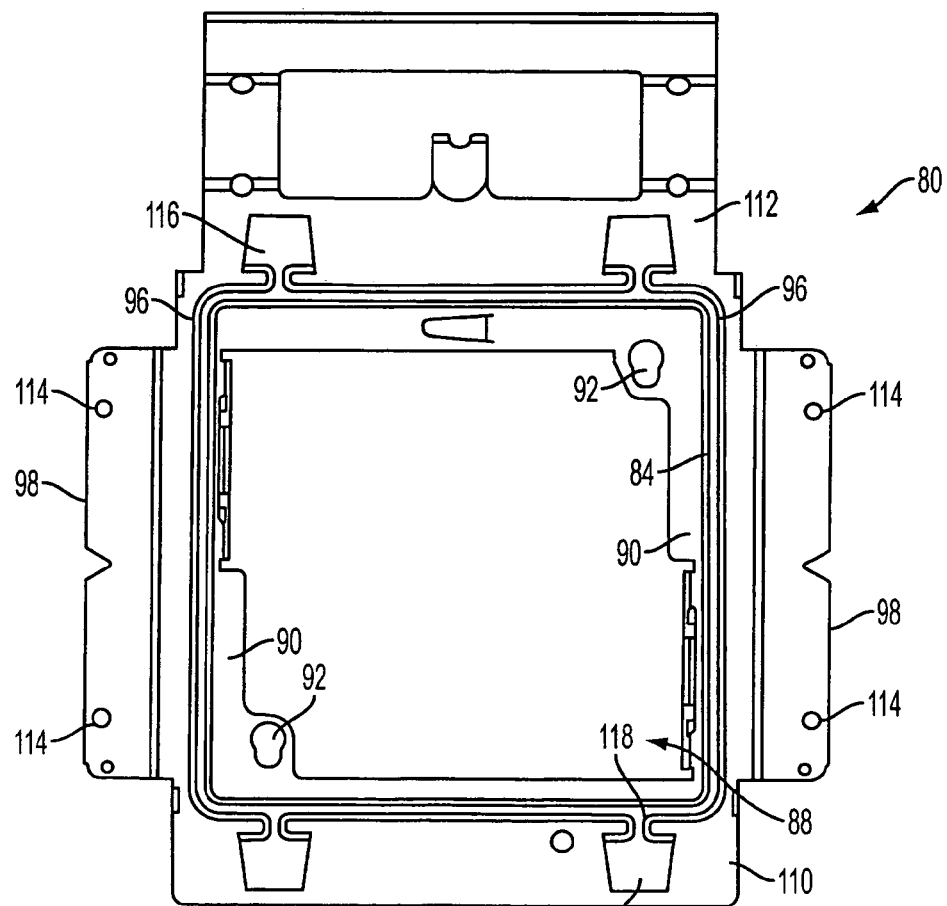
FIG. 11 is a top plan view of the mounting bracket of FIG. 10 formed into the shape for attaching to an electrical box.

Mounting bracket 80 is formed by stamping and bending blank 82 as shown in FIG. 11. Front plate 84 includes a central opening 88 having flanges 90. Flanges 90 includes a keyhole shaped opening 92 for receiving a mounting screw to attach an electrical box 94 to mounting bracket 80.

Figure 10:
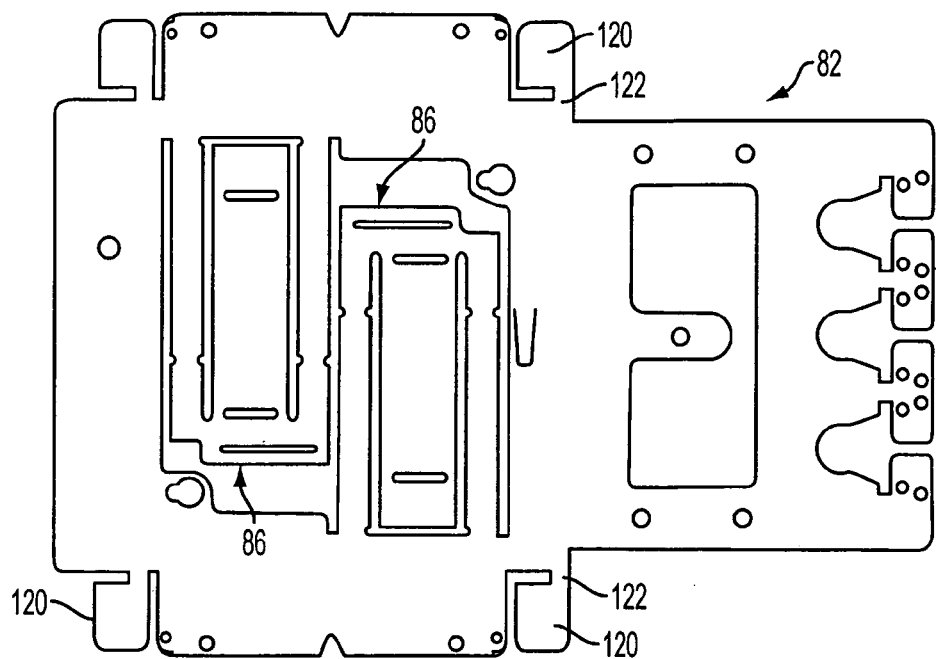
FIG. 10 is a top plan view of the blank for forming the mounting bracket in a second embodiment of the invention.
Figure 12:
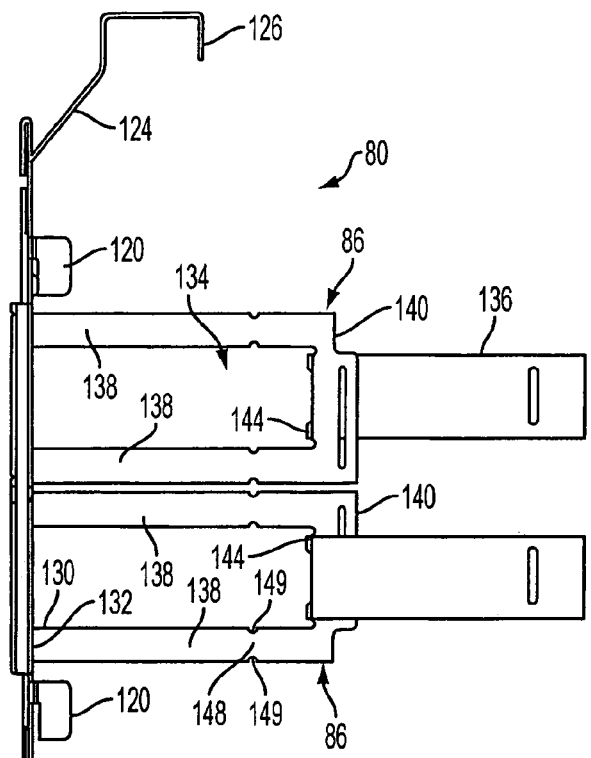
FIG. 12 is a side view of the mounting bracket of FIG. 11 showing the support member and extension member in the extended position.

Front plate 84 includes a raised rib 96 surrounding central opening 88. Front plate 84 includes outwardly extending mounting flanges 98 extending from the side edges of front plate 84. A lower mounting flange 100 extends outwardly from front plate 84 and an upper mounting flange 112 extends from an upper edge of front plate 84. Side mounting flanges 98 are provided with apertures 114 for receiving a fastener to mount mounting bracket 80 to a support structure such as a wall stud. Lower mounting flange 110 and upper mounting flange 112 can also include apertures for mounting the mounting bracket to a support structure. In the embodiment illustrated, lower mounting flange 110 and upper mounting flange 112 are provided with punched tabs 116 connected to front plate 84 by a fold line 118. Tabs 116 can be bent outwardly and inserted through slots in a metal support. Each corner of front plate 84 includes a tab 120 connected to front plate 84 by a leg 122 as shown in FIGS. 10 and 12. Tab 120 is bent 90° with respect to the plane of front plate 184 for hooking into a slot of a metal support as discussed hereinafter in greater detail.

Upper flange 112 includes a pair of spaced-apart legs 124 coupled to a support bracket 126. Support bracket 126 includes openings 128 for receiving connector members for guiding wires and cables to electrical box 94.

Figure 13:
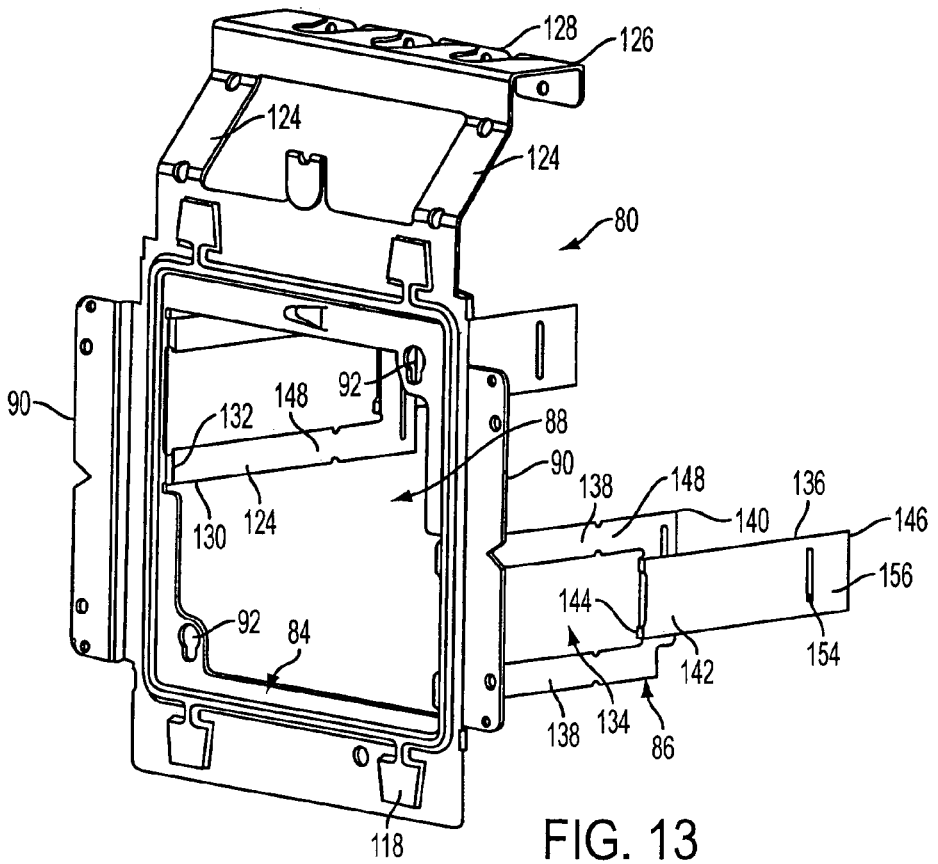
FIG. 13 is a perspective view of the mounting bracket of FIG. 12.
Figure 14:
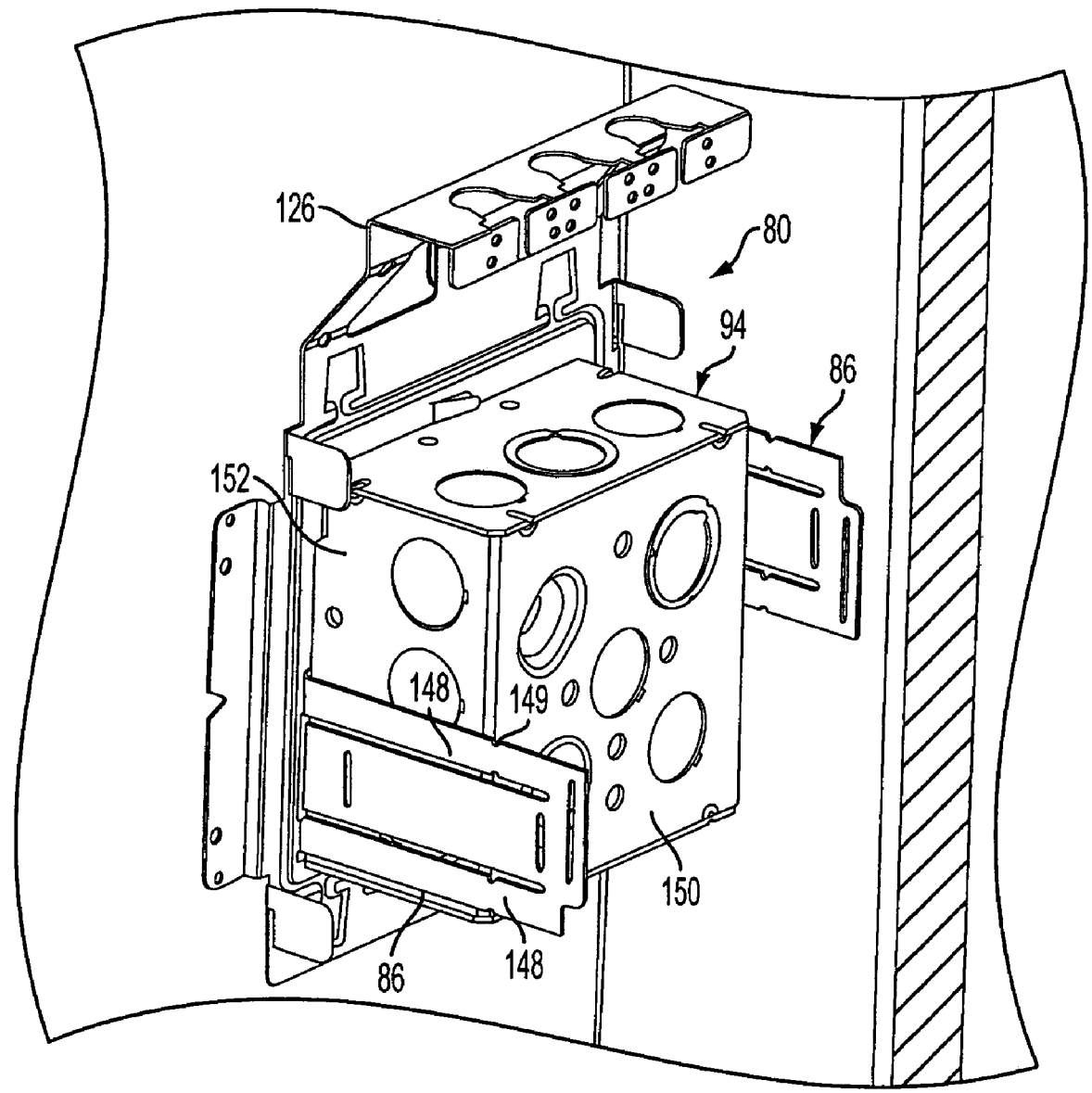
FIG. 14 is a perspective view of the mounting bracket showing the electrical box attached to the mounting bracket.

As shown in FIGS. 13 and 14, support members 86 are initially bent to a position perpendicular to the plane of front plate 84. Support members 86 are cut from the material that is removed to form central opening 88 and are integrally formed with opposite side edges of central opening 88. Support members 86 are formed on opposite side inner edges of central opening 88 as shown in FIG. 13. Support members 86 have a first end 130 connected to front plate 84 by a fold line 132. Support members 86 are formed with a cut-out portion 134 to form an extension member 136. Cut-out portion 134 forms a pair of legs 138 of support member 86 extending from first end 130 to second end 140. Extension member 136 has a first end 142 coupled to second end 140 of the extension member by a fold line 144 to enable the extension member to be folded outwardly from support member 86. Extension member 136 has a second end opposite first end 142.

Figure 15:
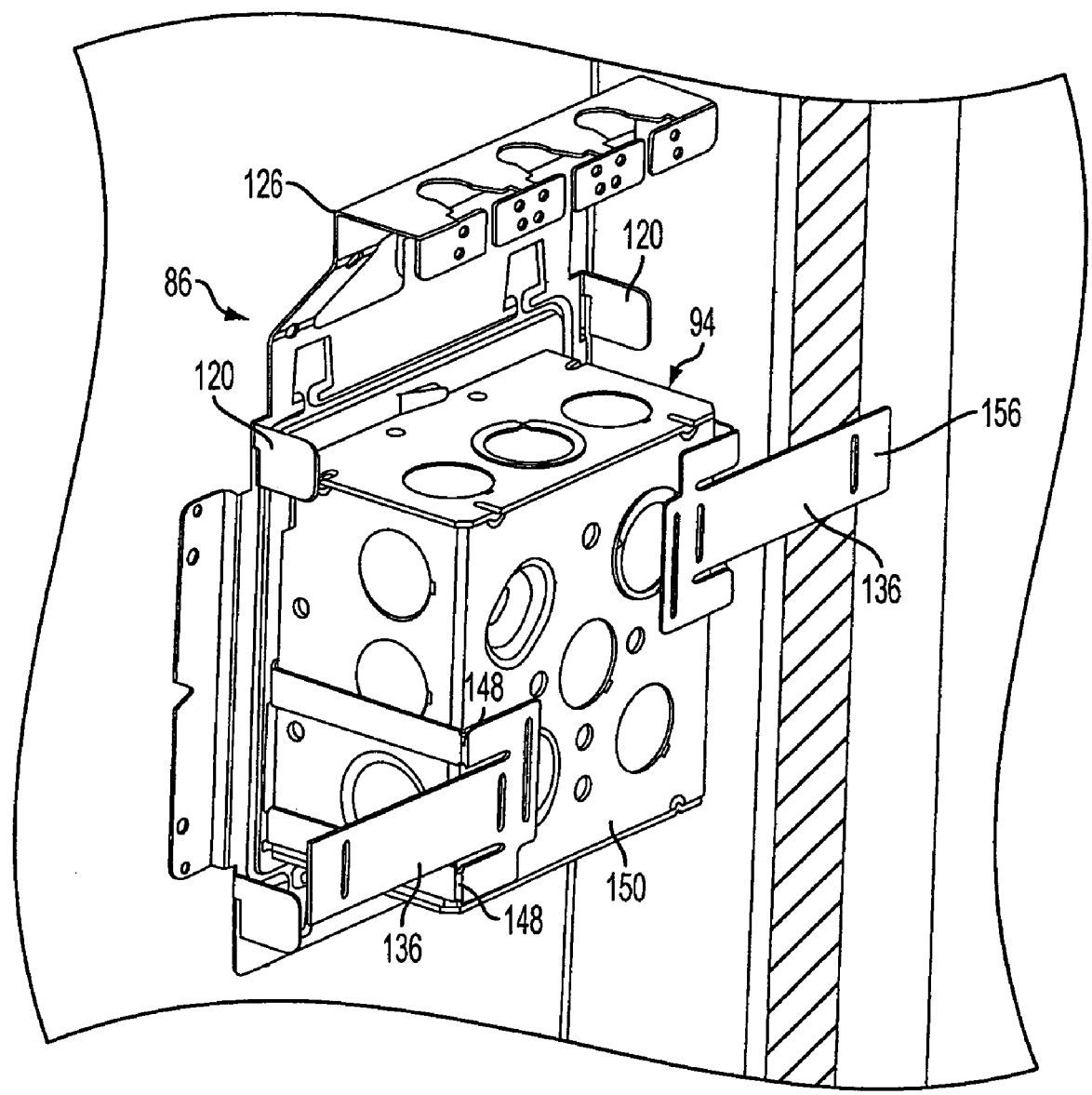
FIG. 15 is a perspective view showing the support members bent to a position to support the electrical box with the mounting bracket.

Referring to FIGS. 14 and 15, electrical box 94 is attached to mounting bracket 80 so that the open front end of electrical box 194 is aligned with central opening 88. The legs 144 of the support member include a fold line 148 spaced from first end 130 of the support member a distance corresponding substantially to the depth of electrical box 94. Fold lines 148 are defined by notches 149 formed on the edges of legs 138. In one embodiment, legs 138 are bent along the respective fold line 148 so that second end 140 of the support member is folded flat against the back wall 150 of electrical box 94. In this embodiment, extension members extend perpendicular to legs 138 and substantially parallel to front plate 84. In this embodiment, support members 86 assist in holding and positioning electrical box 94 to front plate 84 while the appropriate mounting screws or fasteners are used to attach electrical box 94 to front plate 84.

Figure 16:
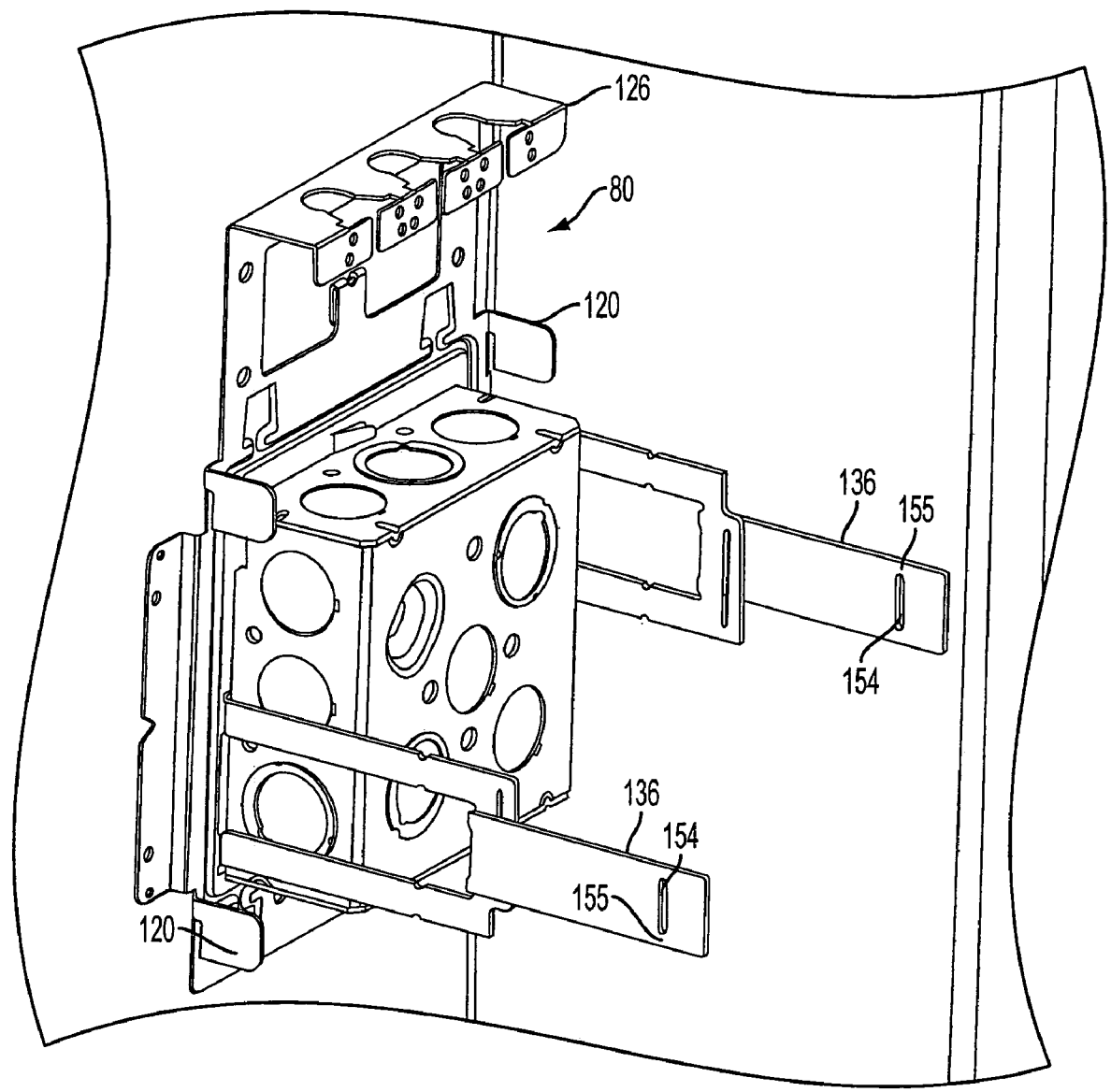
FIG. 16 is a perspective view showing the support member and extension members in the extended position.

Referring to FIG. 16, electrical box 94 is shown attached to front plate 84 with support members 86 extending substantially perpendicular to front plate 84 and parallel to the side walls of electrical box 94. As shown, extension members 136 are folded outwardly to extend parallel to support members 86. In the embodiment of FIG. 16, electrical box 94 has a depth that is less than the depth of the electrical box of FIGS. 14 and 15. Extension members have a length to contact the inner support of an opposing wall as in the previous embodiment.

Figure 17:
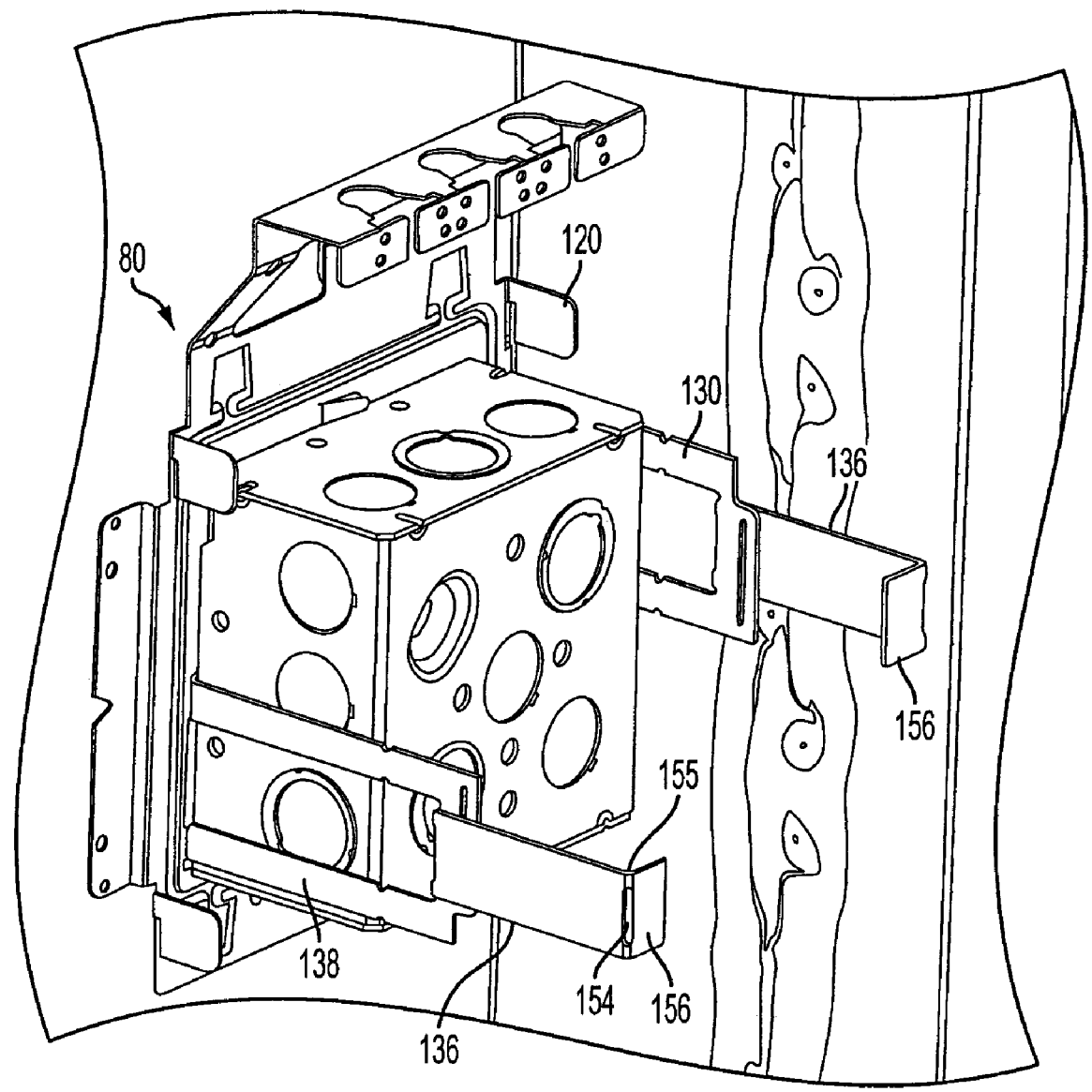
FIG. 17 is a perspective view showing the mounting bracket with the ends of the extension members bent to reduce the effective length of the extension members.

As shown in FIG. 17, extension members 136 include a slot 154 defining a fold line 155 extending transversely to a longitudinal dimension of extension member 136. The end portion of extension member 136 can be folded inwardly perpendicular to the plane of the main portion of extension member 136 to define a tab 156. Tab 156 has a dimension to contact the inner surface of an opposing wall to support electrical box 94 and resist movement of the electrical box with respect to the support structure.

Figure 18:
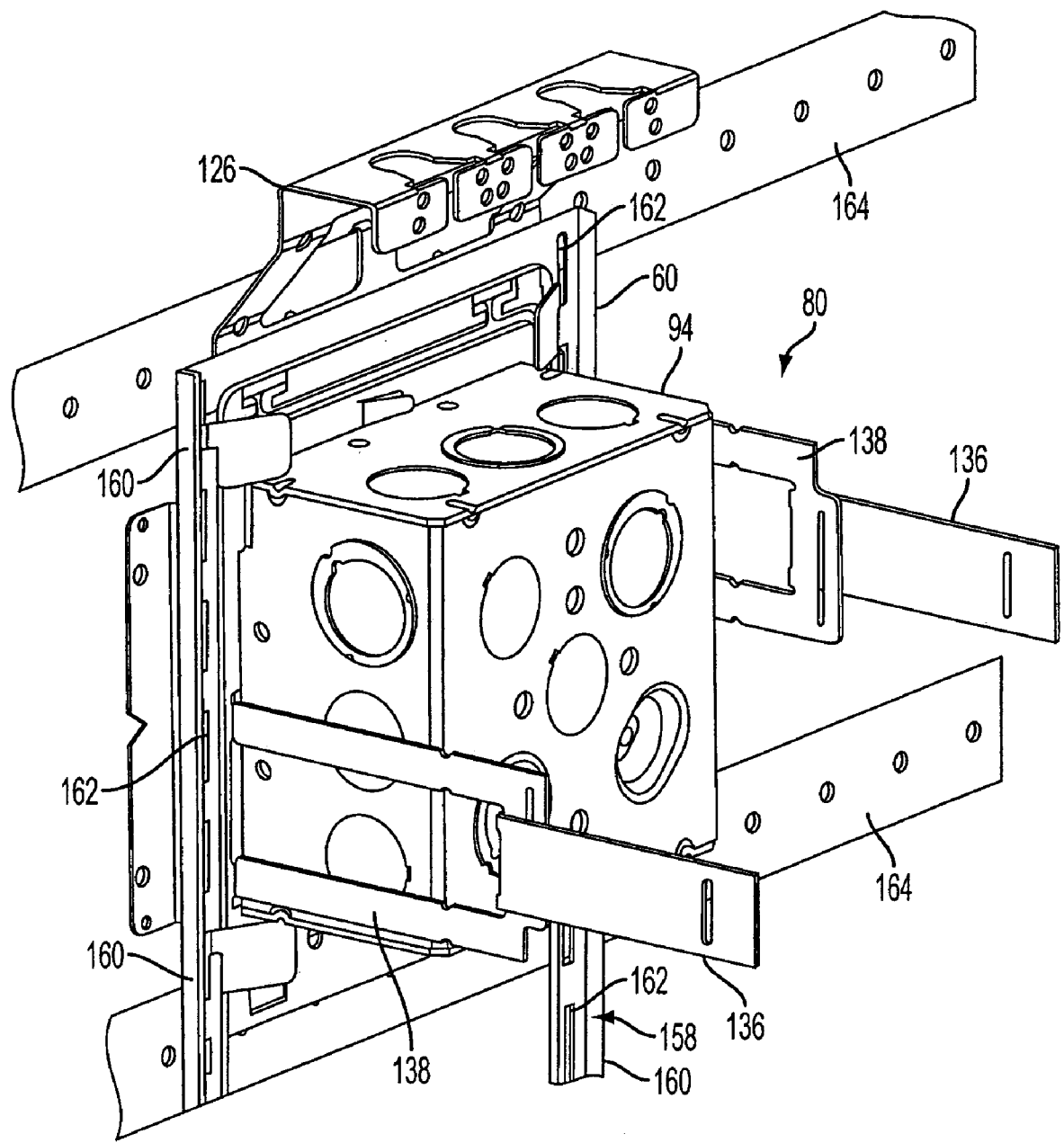
FIG. 18 is a perspective view showing the mounting bracket attached to a support structure by use of the integrally formed mounting tabs.

Referring to FIG. 18, mounting bracket 80 can function as a universal mounting bracket capable of mounting to various metal supports such as floor supports or ceiling supports. In the embodiment shown in FIG. 18, mounting bracket 80 is attached to a vertically extending support structure 158 including two parallel rails 160 having a plurality of spaced-apart slots 162. The hook-like tabs 120 extending from front plate 84 are inserted through a respective slot 162 and bent inwardly in a direction toward the front plate 84 to lock the mounting bracket and electrical box in position with the support 158. The tabs 116 extending from the lower flange 110 and upper flange 112 are hooked onto horizontal supports 164. In the embodiment shown, support members 86 and extension member 136 are folded to extend outwardly from front plate 84 and are able to contact an opposing wall to assist in supporting electrical box 94 and resist movement.

While various embodiments have been chosen to illustrate the invention, it will be appreciated that various changes and modifications can be made without departing from the scope of the invention as defined in the appended claims.

What is claimed is:

1. A mounting bracket for coupling to and supporting an electrical box, comprising:
    a mounting base for coupling to said electrical box; and
    at least one body member extending perpendicular to said mounting base and coupled thereto, said body member having a support member for bending along a fold line between a first position lying in the same plane as said body member and a second position perpendicular to said first position, said support member having an extension member coupled to said support member by a fold line and being bendable to an outward position with respect to said support member and being parallel to said support member for supporting said electrical box.

2. The mounting bracket of claim 1, wherein
said mounting base includes a member for attaching said base to a side wall of said electrical box.

3. The mounting bracket of claim 2, wherein
said body has a substantially planar configuration with at least one strengthening rib formed therein.

4. The mounting bracket of claim 2, wherein
said body has a central opening with a first inner edge and a second inner edge opposite said first inner edge.

5. The mounting bracket of claim 4, wherein
said extension member is coupled to an inner edge of said central opening in said body.

6. The mounting bracket of claim 4, wherein
said extension is coupled to said second inner edge of said opening of said body opposite said first inner edge and said mounting base.

7. The mounting bracket of claim 6, wherein
said extension member has a first end coupled to said second inner edge of said body by a fold line, the extension member being bendable along the fold line to an extended position.

8. The mounting bracket of claim 7, wherein
said extension member has a second end opposite said first end and defining a free end.

9. The mounting bracket of claim 8, wherein
said second end of said extension member includes a tab extending substantially perpendicular to a plane of said extension member.

10. The mounting bracket of claim 2, wherein
said body has a first portion connected to said mounting base, and a second portion defined by said support member and being coupled to said first portion by a fold line, said second portion being bendable from a first position where said second portion is in the same plane as said first portion to a second position where said second portion is perpendicular to said first portion.

11. The mounting bracket of claim 10, wherein
said extension member can be bent outwardly from said body to a first position perpendicular to said second portion of said body and to a second position parallel to said second portion of said body.

12. The mounting bracket of claim 11, wherein
said second portion of said body can be bent to a position perpendicular to said first portion of said body, and said extension member can be bent to a position parallel to said second portion of said body.

13. The mounting bracket of claim 1, wherein
said extension member includes a plurality of fold lines extending in a transverse direction with respect to a longitudinal dimension of said extension member.

14. The mounting bracket of claim 13, wherein
said extension member includes a plurality of slots defining each of said plurality of fold lines in said extension member.

15. An electrical box assembly, comprising:
an electrical box having at least one side wall, a back wall, an open front and an inner cavity for receiving electrical wiring, said electrical box being mountable to a support structure for supporting a first wall structure; and
an adjustable bracket for supporting at least one side of said electrical box against an opposing second wall structure, said bracket having a base coupled to said at least one side wall of said electrical box, a body extending perpendicular to said base and lying in a first position against said back wall of said electrical box, said body having a first portion coupled to said base and being perpendicular to said base, and a second portion coupled to said first portion by a fold line and being bendable to a second position perpendicular to said first portion and to said back wall of said electrical box, said second portion of said body having a length to contact said opposing wall to support said electrical box against said opposing second wall when said second portion is in said second position.

16. The electrical box assembly of claim 15, wherein
said body has a central opening with a first inner edge adjacent said first portion and a second inner edge opposite said first inner edge, an extension being coupled to said second inner edge by a fold line whereby said extension can be folded outwardly with respect to said second portion of said body and said back wall of said electrical box.

17. The electrical box assembly of claim 16, wherein
said extension has a first end coupled to said second portion of said body and a second free end.

18. The electrical box assembly of claim 16, wherein
said second free end of said extension member includes a tab extending outwardly from a plane of said extension member.

19. The electrical box assembly of claim 17, wherein
said extension member includes a plurality of fold lines extending in a transverse direction with respect to a longitudinal dimension of said extension member.

20. The electrical box assembly of claim 19, wherein
said extension member includes a plurality of slots defining said plurality of fold lines in said extension member.

21. The electrical box assembly of claim 16, wherein
said extension can be bent outwardly from said second portion of said body to a position perpendicular to said second portion of said body and perpendicular to said rear wall of said electrical box.

22. The electrical box assembly of claim 21, wherein
said second portion of said body can be bent to a position perpendicular to said first portion of said body and said back wall of said electrical box, and said extension member can be bent to a position parallel with said second portion of said body and perpendicular to said rear wall of said electrical box.

23. A mounting bracket and electrical box assembly comprising:
a base coupled to an electrical box for mounting the box to a first wall and having a central opening for accessing said electrical box, said base having a first side edge and a second side edge opposite said first side;
a first support member coupled to an inner edge of said central opening at said first side of said base and extending in a direction perpendicular to a plane of said base and having a length for contacting an opposing wall, said first support member having an open portion with an inner edge, and an extension member coupled to said inner edge of said open portion and being bendable to an extended position; and
a second support member coupled to an inner edge of said central opening at said second side of said base and extending in a direction perpendicular to said plane of said base and having a length for contacting a opposing wall, said second support member having an open portion with an outer edge, and an extension member coupled to said outer edge of said open portion and being bendable to an extended position.

24. The mounting bracket of claim 23, wherein each of said first and second support members are coupled to said base by a fold line and are bendable from a first position lying in a plane of said base within said central opening to said position perpendicular to said base.

25. The mounting bracket of claim 24, wherein
each of said support members include a body member having a length to contact said opposing wall to support said electrical box, and has at least one fold line extending transverse to a longitudinal direction of said support member.

26. The mounting bracket of claim 25, wherein
said body has side edges with opposing notches defining said fold lines.

27. The mounting bracket of claim 23, wherein
said open portion in each of said first and second support members defines a pair of parallel legs, said legs having a first end coupled to said inner edge of said central opening of said base and a second end spaced from said first end.

28. The mounting bracket of claim 27, wherein
said extension member being bendable from a first position where said extension member extends into said open portion to a second position where said extension member extends outwardly from said body member.

29. The mounting bracket of claim 28, wherein
said extension member includes at least one fold line extending in a transverse direction to a longitudinal direction of said extension.

30. An electrical box assembly, comprising:
an electrical box having side walls, a back wall, an open front and an inner cavity receiving electrical wiring;
an adjustable bracket coupled to said electrical box for supporting a side of said electrical box against an opposing wall, said adjustable bracket having a body member with a first portion and a second portion, said second portion being bendable with respect to said first portion from a first position contacting the back wall of the electrical box to a second position extending perpendicular to said back wall and having a length to contact the opposing wall, said second portion having an open portion defining an inner edge; and
an extension member coupled to said inner edge by a fold line and being movable from a first position extending toward said first portion to an extended position away from said first portion to contact the opposing wall.

31. The electrical box assembly of claim 30, wherein
said first portion of said body member is parallel to and contacts the back wall of the electrical box.

32. The electrical box assembly of claim 31, wherein
said adjustable bracket further comprises a base coupled to the side wall of the electrical box and where said first portion of said body member is coupled to said base and extends substantially perpendicular to said base.

33. The electrical box assembly of claim 30, further comprising:
a mounting bracket for coupling to a support, the mounting bracket having an outer surface with a plurality of embosses to contact a wall surface and space the wall surface from the open end of the said electrical box.

34. An electrical box assembly comprising:
an electrical box having a side wall, a back wall, and an open front, said electrical box being mounted to a support member supporting a first wall, and a second opposing wall;
an adjustable bracket having a first portion coupled to said back wall of said electrical box and extending parallel to said back wall, a second portion having a first end coupled to said first portion and extending perpendicular to said first portion and extending between said back wall of said electrical box and said second wall, and an extension portion having a first end coupled to a second end of said second portion and extending parallel to and overlying said first portion, said extension portion having a plurality of spaced-apart fold lines.

35. The electrical box assembly of claim 34, wherein said extension portion has a first fold line at said first end, a second fold line at a second end and a third fold line spaced between said first and second fold lines and being positioned closer to said second end than said first end of said extension member, said extension member positioned closer to said second end than said first end of said extension member.

36. An electrical box assembly, comprising:
   an electrical box having at least one side wall, a back wall, an open front and an inner cavity for receiving electrical wiring and an electrical device, said electrical box being mountable to a support for supporting said electrical box with respect to a first wall; and
   an adjustable bracket for supporting said electrical box with respect to an opposing second wall, said adjustable bracket having a first portion parallel and coupled to an outer surface of said back wall, a support member coupled to said first portion by a first fold line and being bendable to a position extending substantially perpendicular to said first portion and to said back wall, and an extension portion having a first end coupled to an end of said second portion and being bendable to a position parallel to said first portion and overlying said first portion, said extension portion having a second end and a plurality of fold lines.

37. The electrical box assembly of claim 36, wherein said extension portion has a fold line at said first end, a second fold line at said second end, and a third fold line spaced between said first and second fold lines and being bendable with respect to said second section to extend substantially perpendicular to said first portion and where said extension member is bendable about said first, second and third fold lines to define an end portion extending parallel to and overlying said first portion.

* * * * *